United States Patent [19]

Fischer

[11] Patent Number: 4,561,685
[45] Date of Patent: Dec. 31, 1985

[54] PROTECTIVE PAD FOR SIDE OF MOTOR VEHICLE

[76] Inventor: Ronald E. Fischer, 6716 Spoonwood La., Fort Worth, Tex. 76137

[21] Appl. No.: 527,228

[22] Filed: Aug. 29, 1983

[51] Int. Cl.⁴ .......................................... B60R 13/04
[52] U.S. Cl. .................................... 293/128; 280/770
[58] Field of Search ....................... 293/128; 280/770; 296/136; 160/105, 354, 368; 297/219; 248/345.1; 428/292–294, 256

[56] References Cited

U.S. PATENT DOCUMENTS

| 3,367,702 | 2/1968 | Sauer | 293/128 |
| 4,014,583 | 3/1977 | Forbes | 293/128 |
| 4,383,712 | 5/1983 | Kaganas | 297/219 |
| 4,401,331 | 8/1983 | Ziner et al. | 293/128 |

Primary Examiner—Robert R. Song
Attorney, Agent, or Firm—Arthur F. Zobal

[57] ABSTRACT

A flexible belt adapted to be located around the top edge, the outside, the bottom edge and inside of one of the side doors of a motor vehicle such that the door may be closed with the belt secured in place looped around the door. An elongated protective pad is secured to the belt at a position such that it may be located on the outside of the motor vehicle in a generally horizontal position when the belt is secured in place looped around the door.

4 Claims, 5 Drawing Figures

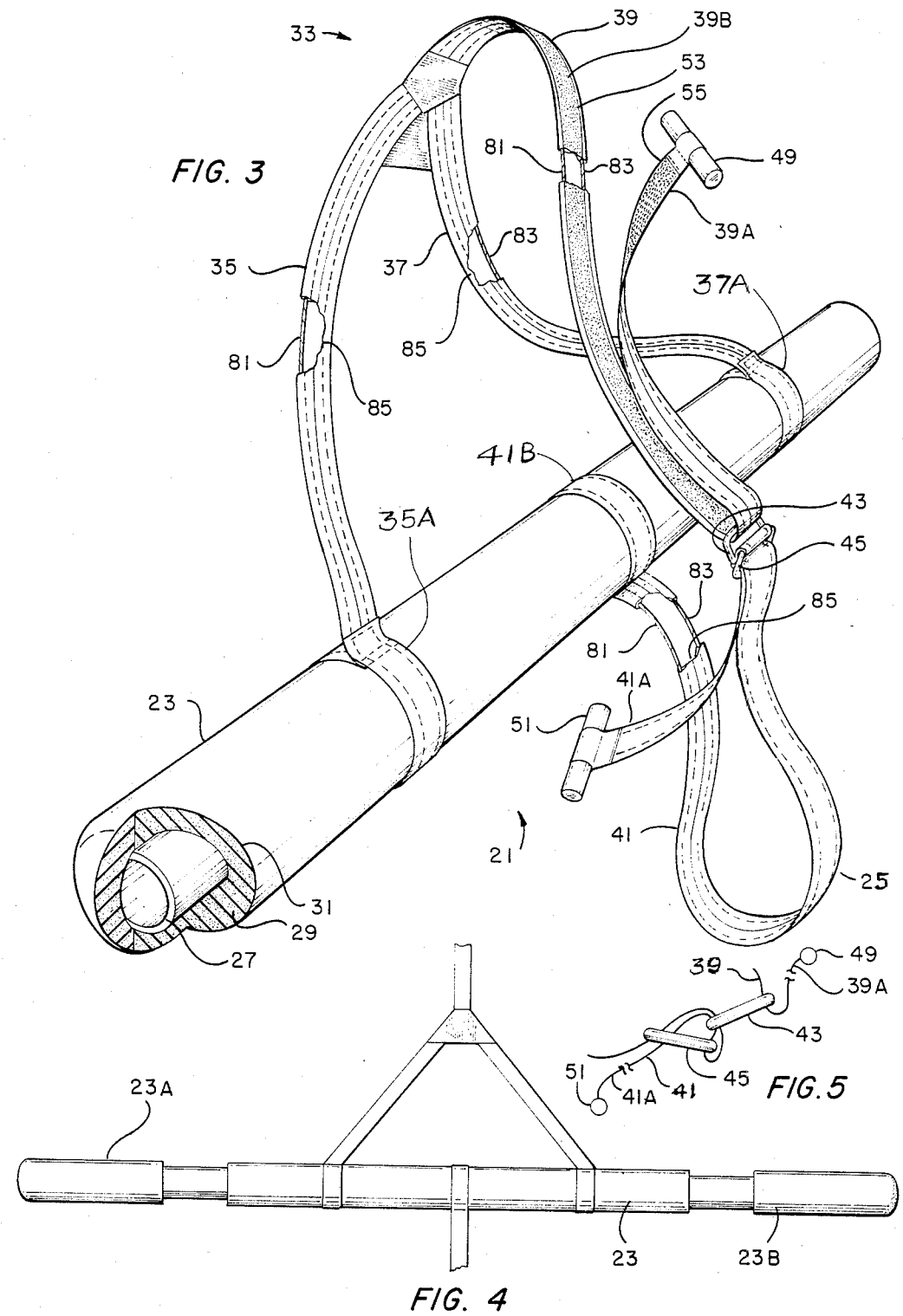

PROTECTIVE PAD FOR SIDE OF MOTOR VEHICLE

BACKGROUND OF THE INVENTION

In many instances, vehicles are parked too close in together in public parking places and when a door is opened, it hits the side of an adjacent vehicle and forms a dent therein. The dents are unsightly and costly to repair. Devices have been produced to protect the sides of parked vehicles, however, none of the devices that I known of are satisfactory. One such device is attached to the outside of the vehicle with magnets. Another device is attached to the front door jam. These devices do not provide the protection desired and are easily stolen.

BRIEF DESCRIPTION OF THE DRAWINGS

FIG. 3 illustrates the complete protective device of the present invention with its flexible belt.

FIG. 4 illustrates a modified pad with telescoping ends.

FIG. 5 illustrates an adjusting buckle arrangement of the belt of the protective device.

SUMMARY OF THE INVENTION

Figure 1:
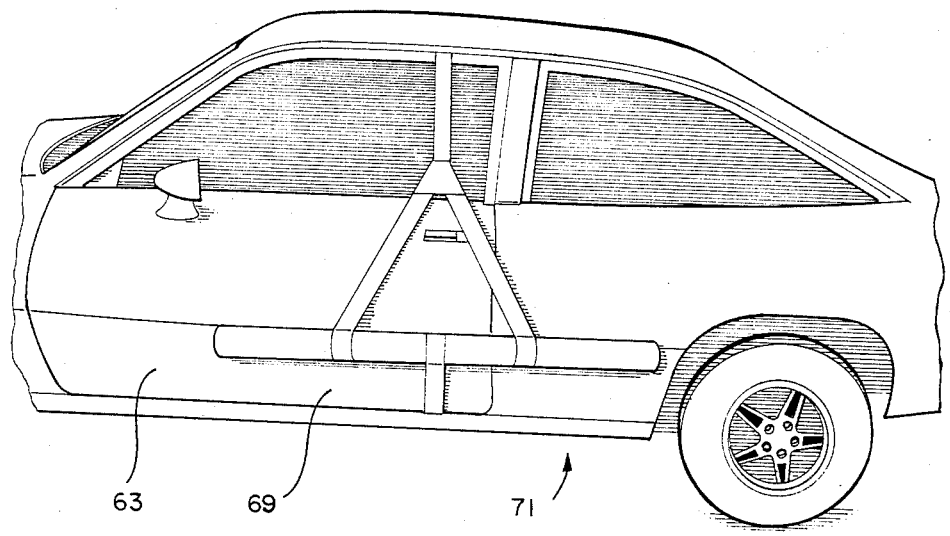
FIG. 1 illustrates the protective device of the invention with its pad secured in place on the outer side of an automobile.
Figure 2:
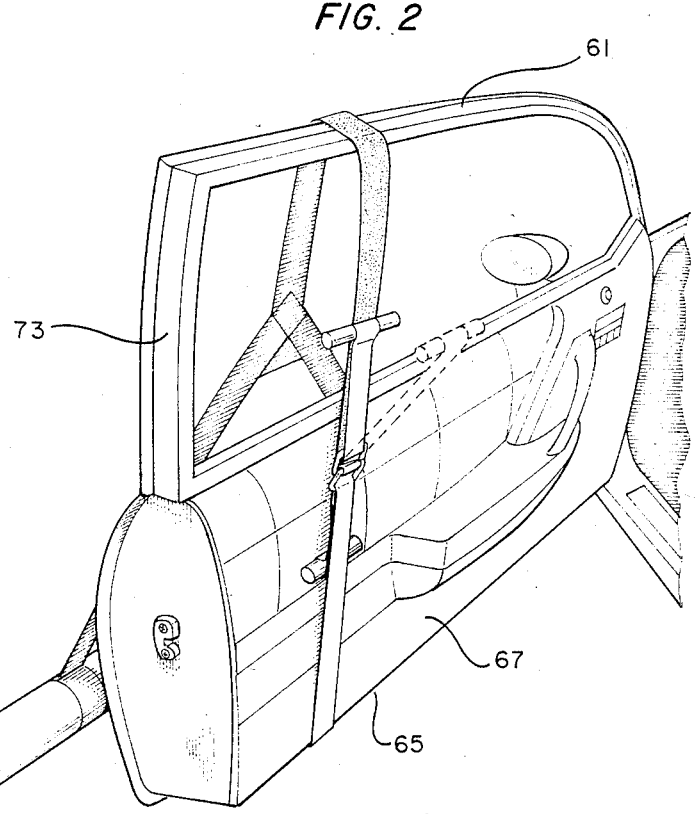
FIG. 2 illustrates the ends of the belt of the protective device secured together on the inside of the door of the automobile.

It is an object of the present invention to provide a protective device for the side of a motor vehicle which provides adequate protection and is not easily stolen.

The protective device comprises a flexible belt means adapted to be located around the top edge, the outside, the bottom edge, and the inside of one of the doors of the motor vehicle such that the door may be closed with said flexible belt means secured in place looped around the door. A protective pad means is secured to said flexible belt means at a position such that it may be located on the outside of the motor vehicle when said flexible belt means is secured in place looped around the door.

In a further aspect, said protective pad means is elongated and is secured to said flexible belt means such that it extends generally horizontally along the side of the motor vehicle when said flexible means is secured in place looped around the door.

Said flexible belt means has two ends adapted to be located on the inside of the door of the motor vehicle. Coupling means is provided for coupling said two ends together on the inside of the door of the motor vehicle such that said two ends may be secured together to allow one to tighten said flexible belt means around the door of the motor vehicle.

In a further aspect, the portions of said flexible belt means that are to be located on the outside of the door comprise strong flexible metal wire means.

DESCRIPTION OF THE PREFERRED EMBODIMENTS

Referring now to the drawings, the protective device of the invention is identified at 21. It comprises an elongated pad 23 connected to a flexible belt 25. The pad 23 is formed from a hollow plastic pipe 27 encased with plastic foam 29 held in place by flexible cover 31 which also may be formed of suitable plastic material.

The belt 25 comprises a Y shaped portion 33 having two thin arms 35 and 37 attached to the pad and a thin central portion 39 attached to the arms 35 and 37. A second thin portion 41 of the belt 25 is attached to the pad between the arms 35 and 37. Two metal loops 43 and 45 are provided as an adjusting buckle. The free end 39A of the central portion 39 of the belt extends through loops 43 and has a gripping device 49 attached thereto. The free end 41A of the second portion of the belt extends through loops 43 and 45 and has a gripping device 51 attached thereto. Velcro fabrics 53 and 55 are attached to the side 39B of the central portion 39 of the belt 23. The belt as shown forms a loop adapted to fit around the top edge 61, the outside 63, the bottom edge 65 and the inside 67 of the door 69 of a motor vehicle such as an automobile 71. Belt portion 41 is fed through loops 43 and 45 to a desired position to initially adjust the belt to the size of the door. The buckle loops 43 and 45 tightly secure the belt portion 41 in place after the adjustment is made. The belt then is fitted around the door 69 from its end 73 with the pad 23 on the outside of the door. The gripping device 49 then is pulled tightly upward and the belt portions 39 having the Velcro fabrics 53 and 55 are moved together to engage the Velcro fabrics 53 and 55 to secure the belt 23 tightly around the door with the pad 23 on the outside thereof. Due to manner of connection of the arms 35 and 37 and portion 41 of the belt of the belt to the pad 23, the pad 23 will extend along the outside of the door 69 generaly horizontally. The door can then be closed and locked and the protective device cannot be removed from the motor vehicle.

In order to prevent the belt from being cut or to make it difficult for one to cut the belt to prevent theft of the device, each belt portion 39 and 41 is formed of two flexible stainless steel wires (aircraft cable) 81 and 83 encased in a suitable fabric 85. Arms 35 and 37 each has only one flexible stainless steel wire 81, 83 in its outer edge which is encased in a suitable fabric 85. The end portions 35A and 37A of arms 35 and 37 are wrapped around the pad 23 and sewn thereto. In addition, the end portion 41B of belt portion 41 is wrapped around the pad 23 and sewn thereto. Although not shown, the ends of the steel wires 81 and 83 of arms 35 and 37 and the ends of the steel wires 81 and 83 of belt end portion 41B extend through suitable holes formed through the cover 31 and foam 29 of the pad 23 and are secured directly to the tube 27. The ends of the steel wires 81 and 83 in belt ends 39A and 41A are tied to the gripping devices 49 and 51.

The user may carry a desired number of the devices 21 in his vehicle and when he parks they will be secured to the doors as described to protect the vehicle from dents being formed in the outside thereof. When the driver returns to the vehicle he will unfasten and remove the devices 21 from the doors and store them in the vehicle while driving.

The length and diameter of the pad 23 may vary depending on the type of vehicle it is being used with. In one embodiment the pad 23 has a length of four feet and a diameter of about $3\frac{1}{4}$ inches. Arm portions 35 and 37 each are 24 inches long; belt portion 39 is 42 inches long; and belt portion 41 is 48 inches long. Each of the belt portions 35, 37, 39, and 41 has a width of about 2 inches and a thickness of about 3/16 of an inch.

FIG. 4 illustrates a modification of the pad 23 which has telescoping ends 23A and 23B which may be extended or retracted depending upon the length of the area of the vehicle desired to be protected.

I claim:

1. A device for protecting the side of a motor vehicle of the type having at least one door adapted to open and close by swinging about a generally vertical axis, comprising:

an elongated protective pad adapted to be located on the outside of the motor vehicle and next to said door, a first flexible belt means comprising a Y shaped member having two flexible arms and a flexible central portion, said two arms having first ends connected to said protective pad at spaced apart positions and second ends connected together and to a first end of said central portion, said central portion having a second end with coupling means connected thereto, a second flexible belt means having a first end connected to said protected pad between said spaced apart positions and a second end with coupling means connected thereto, said two arms of said Y shaped member of said first flexible belt means and at least a portion of said second flexible belt means being adapted to be located on the outside of said door of said motor vehicle with a portion of said central portion of said first flexible belt means being located around the top edge of said door and a portion of said second belt means located around the bottom edge of said door such that said two coupling means of said first flexible belt means and of said second flexible belt means may be coupled together on the inside of said door to support said protective pad on the outside of and adjacent said door in a generally horizontal position, said central portion of said first flexible belt means and said second flexible belt means being relatively thin to allow said door to be closed with said protective pad located on the outside of and adjacent to said door and in a generally horizontal position, said two coupling means being adapted to be coupling together such that said first and second flexible belt means may be tightened and secured in place looped around said door.

2. The device of claim 1, comprising:

strong flexible metal wire means coupled to said two arms of said Y shaped member, to said central portion of said first flexible belt means and to said second flexible belt means such that said strong flexible metal wire means will be located on the outside of said door in said two arm means, said central portion, and said second belt means and around the top edge and the bottom edge of said door when said door is closed.

3. The device of claim 1, wherein:

said central portion and said second flexible belt means are generally in line with each other along a plane which extends through about the mid-point of the length of said protective pad, said central portion and said second flexible belt means being the only members of said device to be located around the top and bottom edges respectively of said door.

4. The device of claim 3, comprising:

strong flexible metal wire means coupled to said two arms of said Y shaped member, to said central portion of said first flexible belt means and to said second flexible belt means such that said strong flexible metal wire means will be located on the outside of said door in said two arm means, said central portion, and said second belt means and around the top edge and the bottom edge of said door when said door is closed.

* * * * *